United States Patent [19]
Saito et al.

[11] Patent Number: 5,959,428
[45] Date of Patent: Sep. 28, 1999

[54] STARTING CONTROL UNIT FOR A REFRIGERATION MACHINE

[75] Inventors: Katuhiko Saito; Keitaro Hori; Haruhiko Ishida; Hidekazu Totsuka, all of Tokyo, Japan

[73] Assignee: Mitsubishi Denki Kabushiki Kaisha, Tokyo, Japan

[21] Appl. No.: 08/956,099

[22] Filed: Oct. 24, 1997

[30] Foreign Application Priority Data

Mar. 10, 1997 [JP] Japan .................................... 9-054367

[51] Int. Cl.$^6$ ...................................................... H02P 1/46
[52] U.S. Cl. ......................... 318/705; 318/812; 62/228.4
[58] Field of Search ........................... 318/705, 798–815, 318/778, 782, 707, 715, 717; 62/126, 160, 209, 127, 129, 190–200

[56] References Cited

U.S. PATENT DOCUMENTS

| | | | |
|---|---|---|---|
| 4,259,845 | 4/1981 | Norbeck .................................... | 62/209 |
| 4,451,112 | 5/1984 | Hattori et al. ........................... | 318/778 |
| 4,724,680 | 2/1988 | Kawai ....................................... | 62/115 |
| 4,736,595 | 4/1988 | Kato .......................................... | 62/160 |
| 4,968,338 | 11/1990 | Sugiyama ................................ | 62/126 |
| 5,506,487 | 4/1996 | Young et al. ............................ | 318/811 |

FOREIGN PATENT DOCUMENTS

| | | |
|---|---|---|
| 0 537 512 | 4/1993 | European Pat. Off. . |
| 56-134561 U | 3/1955 | Japan . |
| 58-97995 U | 7/1983 | Japan . |
| 6-15864 | 3/1994 | Japan . |

OTHER PUBLICATIONS

Patent Abstracts of Japan, JP 08–086518, Apr. 2, 1996.
Patent Abstracts of Japan, JP 6–165584, Jun. 10, 1994.
Patent Abstracts of Japan, JP 63–310385, Dec. 19, 1988.
Patent Abstracts of Japan, JP 4–268164, Sep. 24, 1992.

*Primary Examiner*—Jonathan Salata
*Attorney, Agent, or Firm*—Oblon, Spivak, McClelland, Maier & Neustadt, P.C.

[57] ABSTRACT

Without consuming excessive energy, the invented control unit of refrigerating machine can pour out an accurate amount of refrigerant resting inside the lubricant in short time in order to prevent its foaming. A refrigerating machine provided with inverter-driven compressor comprises current detection circuit that detects current being supplied to drive the compressor and a control circuit that controls the compressor based on a detection result from the current detection circuit. The invented control unit for refrigerating machine is characterized in that the control circuit which applies fixed frequency and fixed voltage to the compressor on start-up. An operation of the compressor is valuated using detection result from the current detection circuit, and based on the result from the current detection circuit, operating frequency of the compressor is controlled.

17 Claims, 20 Drawing Sheets

STARTING CONTROL UNIT FOR A REFRIGERATION MACHINE

BACKGROUND OF THE INVENTION

1. Field of the Invention

The invention relates to the control unit of compressor controlling the start-up operation for refrigerating machines such as air conditioners and refrigerators.

2. Description of the Related Arts

Related Art 1.

Conventional configurations and operations of the start-up control unit for refrigerating machines disclosed in the Japanese examined patent publication No. hei6-15864 are explained using FIG. 18.

Conventional compressors incorporated in refrigerating cycle machines, because a large amount of electrical current is required to start an operation of the compressor at a low temperature, tended to fail on start-up due to an activation of "protection circuit" caused from a running of excess current. That is, for a conventional compressor at low temperature, a viscosity of lubricant inside the compressor increases such that the fluidity decreases. This results not only in viscose and frictional drags at abrasive and rotational parts of the compressor, but also allows electrical current to flow easily due to a reduced electrical resistance in the motor coil under low temperature. This being the case, once the start-up failure occurs, even after a recovery from the protection circuit and then attempted to re-start, the compressor is likely to fail again. When this is repeated several times, some of the refrigerating cycle machines may take this as malfunction which can lead to a problem of shutdown of the whole machine.

Even though it will not come to the point of shutdown of the whole machine, there are situations when the machine cannot function for some length of time that this will leads to a danger of losing credibility of the refrigerating machine itself by such forceful start-up.

FIG. 18 has taken into consideration such situations, aiming to provide a start-up control unit of refrigerating cycle machines that has a heat-up function for some period of time before re-starting the machine when the failing occurs.

As FIG. 18 shows, the parts are as follows: compressor 81; pre-heating unit 82; exterior unit 83; central control unit 84; main inverter circuit 85; converter 86; inverter 87; excess current sensor 88 that detects excess current of the compressor 81; excess current detection circuit 90; and interior unit 91.

Next, operation is explained. Upon start-up, when the excess current sensor 88 in the main inverter circuit 85 has detected excess current, the detected signal is transmitted to the central processing unit 84 via the excess current detection circuit 90. At the central processing unit 84, excess current protection circuit is activated, and this stops the start-up of the compressor 81. Simultaneously, frequency output control circuit of inverter at the central processing unit 84 activates the pre-heating unit 82 to heat up the compressor 81. Using the heat from a motor of the compressor 81, a refrigerant resting inside the lubricant is poured out by heating for about 3 minutes. The refrigerant resting inside the lubricant is a medium that was liquified inside the compressor. Under a normal condition the refrigerant is carbureted to be used by the compressor 81 during the refrigerating cycle. However, due to a decreased temperature from the stopped compressor, the carbureted refrigerant is liquified, then become mixed with the lubricant. The liquified refrigerant inside the compressor is termed "resting refrigerant". An amount of liquified resting refrigerant is called "amount of resting refrigerant". The refrigerant that is carbureted due to rise in compressor temperature is used in the refrigerating cycle. The reason for pre-heating the compressor is to carburete the resting refrigerant. After pre-heating for 3 minutes, the central processing unit 84 re-activates the compressor 81. A temperature sensor 92 can be attached to the pre-heating unit 82, and the temperature reading can be transmitted to the central processing unit 84 for control.

Related Art 2.

Operation of a control unit of the compressor in conventional air-conditioners disclosed in the Japanese unexamined utility model publication No. sho56-134561 will be explained using FIGS. 19 and 20. Conventionally, when starting the air-conditioner, foaming reaction occurs from the refrigerant being mixed with the lubricant inside the compressor. The foaming of lubricant is caused by an increase in the temperature of compressor, and the lubricant is output from the compressor during refrigerating cycle. This results in a shortage of the lubricant, which causes lots of incident of burning of abrasive parts of the compressor.

To prevent such incidents, a heater was attached to a sealed container of the compressor as shown in Related Art 1; then the compressor was heated to prevent a melting of the refrigerant into the lubricant. However, such a configuration needs a power supply for the heater. The disadvantages were wasting of power, and an addition of extra parts as heater and cables for the heater.

FIGS. 19 and 20 show a configuration of conventional air-conditioner and a block chart of the control unit in Related Art 2. The parts are: compressor 61 containing motor 66 and compressor unit 69 which are designed to be contained inside a sealed container 67. Other parts are: condenser 62; decompressor 63; and evaporator 64. The compressor 61 is connected with the other parts to form a loop to comprise a well-known refrigerating cycle. When the compressor is not rotating, the lubricant 68 resides at an inner bottom of the compressor 61, and most part of the refrigerant are melted to the lubricant. Control unit 65 controls the operation of the compressor 61 and is equipped with the followings: frequency conversion circuit 65a; frequency command circuit 65b; timer circuit 65c which controls the frequency command circuit 65b; and load detection circuit 65d which detects loads on the air-conditioner. 70 is operating switch.

The operation of air-conditioner for above-mentioned configuration is explained below.

First of all, turn on the operating switch 70, and an output command of frequency 0 c/s (cycles/second) is generated to the frequency conversion circuit 65a from the frequency command circuit 65b. The frequency output of 0 c/s from the frequency conversion circuit 65a is made, or in other words, a DC (direct current) is supplied to the motor 66 of the compressor 61. The motor 66 heats up without rotating when the DC flows through. The heat from the motor 66 will heat-up the sealed container 67 and the lubricant 68. Due to this the refrigerant that was melted into the lubricant 68 becomes carbureted and will be separated from the lubricant 68.

The timer circuit 65c is activated after a fixed time t has lapsed, and the frequency command circuit 65b will be controlled by the load detection circuit 65d. As FIG. 21 shows, when the output from the frequency command circuit 65b changes, the frequency output from the frequency conversion circuit 65a will change from 0 c/s to a certain frequency (e.g. frequency in which the motor 66 starts), then the motor 66 will starts rotation and outputs high pressure gas from the compressor 61. This being the case, the refrigerant that is melted into the lubricant 68 should be small, therefore, foaming of the lubricant 68 will not occur, and only the refrigerant gas is output from the compressor 61.

Therefore, when the operation of compressor 61 starts, the burning of each abrasive part of the compressor 61 caused by the shortage of lubricant 68 can be prevented. Also, extra electricity for heating is not necessary.

The frequency output is set to 0 c/s, however, it is also possible to apply a low frequency to cause zero or small number of rotations of the motor 66. Apart from the two types of frequency in the frequency conversion control, can also design a configuration which is controlled by a gradual increase in the frequency. In addition, a period of time for controlling the frequency command circuit 65b by the load detection circuit 65d is determined using a timer, but it can also be done by temperature reading of the compressor 61.

For the conventional operation control unit of air-conditioner, upon starting the compressor, frequency is set to either zero or to a lower frequency so that the rotation of compressor is stopped or reduced. From a heat generated from the coil of motor, the compressor is heated up to evaporate the refrigerant melted into the lubricant. The compressor is designed to rotate after the evaporation that it possesses a number of advantages as: prevention of burning of each abrasive part caused by the shortage of lubricant; and no extra parts are needed such as heater and cables for the heater.

3. Problems to be solved by the Invention

As explained above, for the start-up control unit of refrigerating machine in Related Art 1, after detecting excess current of compressor the compressor 81 is turned off for a fixed amount of time (3 minutes) for heating, and then tries to re-start. Similarly, for the operating control unit of refrigerating machine in Related Art 2, the compressor starts after heating the compressor for a fixed time t using the heat generated from the coil of motor. As can be seen in both cases of Related Arts 1 and 2, the start-ups are controlled without any bearing to the amount of resting refrigerant inside the compressors. Therefore, the problem is: it does not take into account the fact that an immediate re-starting is possible. That is, even in a situation when the resting refrigerant requires only a short heating time (i.e. case when the amount of resting refrigerant is low), and the excess current has flown, it must always stop and wait for a fixed amount of time (3 minutes or time t) before re-starting. When the amount of resting refrigerant is large, on contrary, the 3 minutes or time t may not be enough heating time but it is set to re-start in that period, resulting in consumption of extra energy, in addition, a too much rise in temperature of the motor of compressor can cause various troubles (e.g. burning of abrasive parts from rise in lubricant temperature).

Also, various incidents can result from foaming of the lubricant, making re-starting even more difficult.

SUMMARY OF THE INVENTION

These and other objects are accomplished by the present invention as hereinafter described in further detail.

According to one aspect of the present invention, a control unit of refrigerating machine includes a current detection circuit for detecting current being supplied to drive the compressor, and a control circuit for controlling the compressor based on a detection result from the current detection circuit. According to this embodiment, the control circuit applies initial frequency and initial voltage to the compressor during start-up, valuates operation mode of the compressor using a detection result from the current detection circuit, and controls an operating frequency of the compressor based on the result from the current detection circuit.

The control circuit preferably increases voltage by a fixed voltage for every fixed time period when the compressor is not operated, and then valuates the operating mode of compressor based on the detection result from the current detection circuit. Also preferably, the control circuit increases the frequency of compressor when the voltage being increased for every fixed time has reached previously set driving voltage.

According to another embodiment of the present invention, the control unit further comprises a temperature sensor circuit for detecting temperature characteristic value that is equivalent to temperature of motor of the compressor. In this embodiment, the control circuit valuates whether to apply the initial frequency and the initial voltage to the compressor based on a detected result of the temperature detection circuit at a time of starting signal of the compressor. Preferably, the control circuit valuates whether the temperature characteristic value has exceeded a pre-setted temperature based on a detection result from the temperature detection circuit, after applying the fixed frequency and the fixed voltage to the compressor, and controlling the frequency of compressor when the compressor is not operated.

The control circuit preferably increases the initial voltage by a fixed voltage for every fixed time period when the compressor is not operated, and then valuates whether the temperature characteristic value has exceeded the pre-setted temperature based on the detection result from the temperature detection circuit. The control circuit preferably increases the initial voltage by a fixed voltage for every fixed time when the compressor is not operated, and then valuates whether the temperature characteristic value has exceeded the pre-setted temperature. When the temperature characteristic value has not exceeded the presetted temperature, the control circuit preferably revaluates the operation mode of compressor based on the detection result from the current detection circuit.

The control unit of refrigerating machine may further include an excess current protection circuit for blocking current being supplied to the compressor when the detection result from current detection circuit exceeds an excess current value. Additionally, the control unit of refrigerating machine may include a display unit for indicating a result of blockage at the excess current protection circuit.

Preferably, the control unit gradually increases the voltage until the current reaches a current level sufficient to drive the compressor. The control unit then stops increasing the voltage when the current reaches the current level sufficient to run the compressor. The current detection circuit then detects a current input to the compressor. The current detection circuit may detect a current input to a DC-line current of an inverter element. The current detection circuit may detect a current input from a power source.

According to a further aspect of the invention, a method for controlling a refrigerating machine provided with inverter-driven compressor includes detecting a current being supplied to run the compressor; and controlling the compressor based on a detection result from the current detecting step. In this method, a fixed frequency and fixed voltage are applied to the compressor on start-up. Then, the operation mode of the compressor is valuated using a detection result from the current detecting step, and controlling an operating frequency of the compressor is based on the result from the current detecting step.

The controlling step may include steps of increasing voltage by a fixed voltage for every fixed time when the compressor is not operated, and then valuating the operation mode of compressor based on the detection result from the current detecting step. The controlling step may include a step of increasing the frequency of compressor when the voltage being increased for every fixed time has reached previously set driving voltage.

The control method of refrigerating machine may further comprise a step of detecting temperature characteristic value that is equivalent to temperature of motor of the compressor. In this embodiment, the controlling step includes a step of valuating whether to apply the initial frequency and the initial voltage to the compressor based on a detected result of the temperature detecting step at a time of starting signal of the compressor.

The controlling step may include a step of valuating whether the temperature characteristic value has exceeded a pre-setted temperature based on a detection result from the temperature detecting step, after applying the initial frequency and the initial voltage to the compressor, and controlling the frequency of compressor when the compressor is not operated.

Further scope of applicability of the present invention will become apparent from the detailed description given hereinafter. However, it should be understood that the detailed description and specific examples, while indicating preferred embodiments of the invention, are given by way of illustration only, since various chances and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit of the present invention, and wherein.

DETAILED DESCRIPTION OF THE PREFERRED EMBODIMENTS

Figure 1:
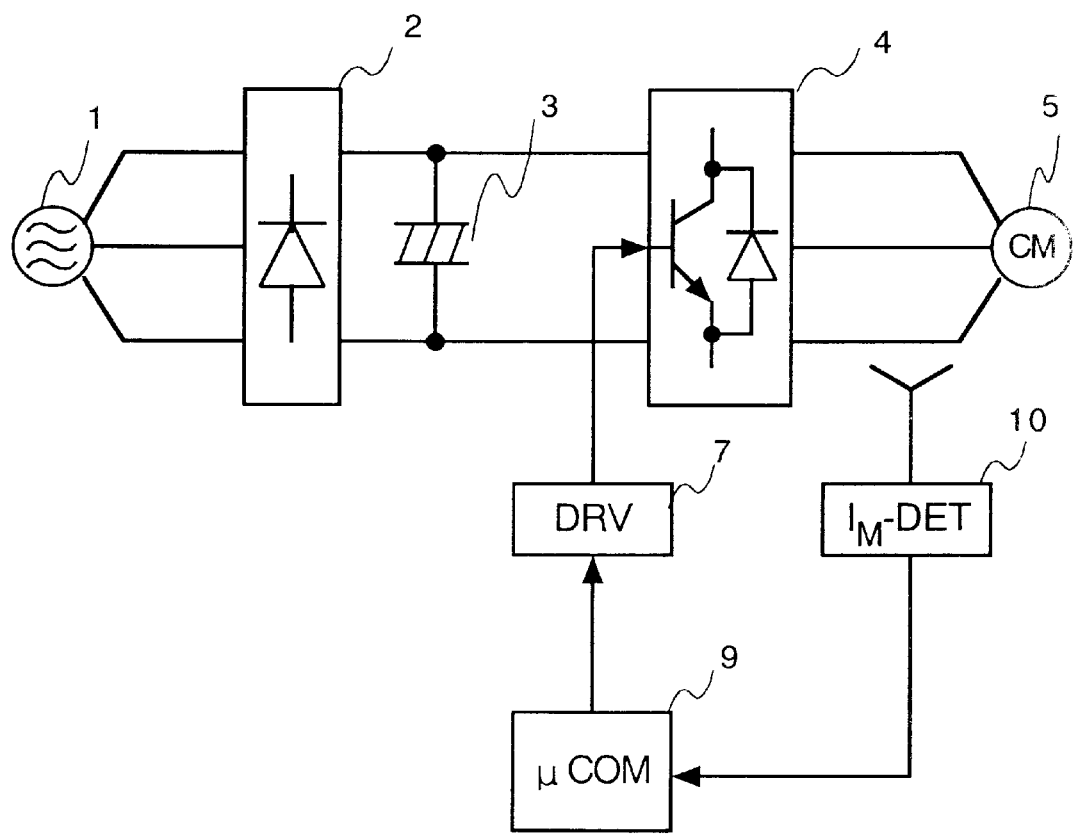
FIG. 1 shows the configuration of control unit of refrigerating machine of embodiment 1.

Reference will now be made in detail to the present preferred embodiments of the invention, examples of which are illustrated in the accompanying drawings, wherein like reference numerals indicate like elements through out the several views.

Embodiment 1

FIG. 1 shows configueation of the compressor for embodiment 1, illustrating the following parts: AC (alternate current) power 1; converter 2 having rectifier diode; smoothing condenser 3; inverter 4 having inverter element; compressor 5 having a motor; driving circuit 7 that drives the inverter element of the inverter 4; current detection circuit 10 which detects current of the compressor; and microprocessor (start-up control unit) 9.

The microporcessor 9 converts current of the compressor detected by the current detection circuit 10, from analog into digital signal. Based on a result of the conversion, the microprocessor controls the driving circuit of inverter element. The microprocessor 9 is a microcomputer (start-up control circuit) having a function of software to control the start-up.

FIG. 2 shows time charts on the start-up of compressor according to the embodiment 1. The horizontal axis of FIGS. 2(a)–2(d) on the charts indicate time lapsed; and the vertical axis of FIGS. 2(a)–2(d) correspond to frequency output of inverter, voltage output of inverter, input current of compressor, and rotation of the motor respectively. In FIGS. 2(a)–2(d) a setup current level IMO is the value of current regarded sufficient to start the motor rotation.

Next, operation is explained.

To begin with, as the FIGS. 2(a)–2(d) show, at start-up, following outputs are made to the compressor: fs, an initial setup value of frequency as frequency output of inverter; and VS1, an initial setup values of voltage VS1 as voltage output of inverter. At the starting time, the frequency output fs is maintained and unchanged until the compressor starts.

Under the maintained frequency output fs, the current detection circuit 10 detects input current IM in locked compressor for every Δt. The detected input current IM exceeds setup current level of IMO at time t1, which is a current level required to start the motor. From time t1, for every Δt, the control unit increases the voltage output VS1 by ΔVS. The reason for the level-up of voltage output VS1 by ΔVS is to obtain a minimum possible input current IM that exceeds the setup current level IMO. This is an attempt to start the motor in minimum possible electricity to conserve energy, also prevents excess current flow.

When the input current IM exceeds the setup current level IMO, the voltage output of the inverter should stop increasing, and should maintain the voltage at that level. For example, after the value of the input current IM has exceeded the setup current level IMO which is a sufficient level to start the motor, at time t2 after Δt has lapsed from time t1, stop increasing the voltage output of inverter to maintain it unchanged.

Figure 2A:
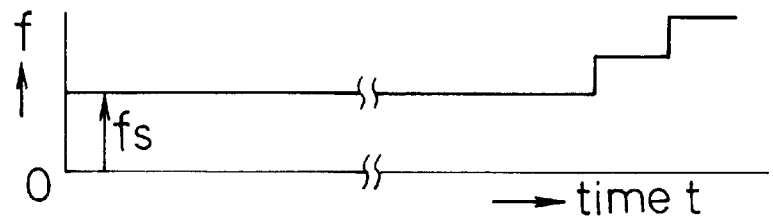
FIGS. 2(a)–2(d) are shows the time charts of control unit of refrigerating machine of embodiment 1.
Figure 2B:
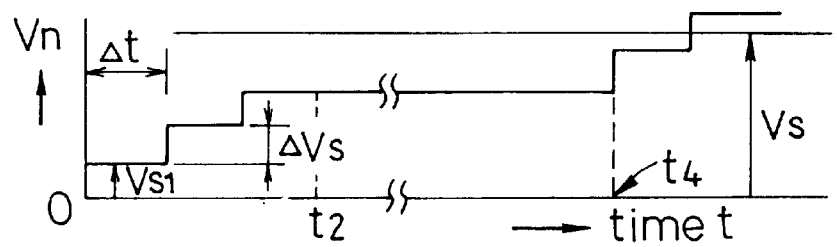

By supplying electricity in this situation, the motor of compressor heats up, and the viscosity of lubricant decreases by the increased temperature. As the frictional resistance of each abrasive part decreases, the compressor starts to rotate, and the input current IM, which is detected by the current detection circuit 10, reduces to below setup current level IMO at time t3. After time Δt has lapsed at time t4, as shown in FIGS. 2(a) and 2(b) the frequency output and voltage output of inverter are increased to control the rotation (frequency) of the compressor depending on loads. What is meant by detecting decreased input current IM from the current detection circuit 10 is, the compressor has begun to rotate. Therefore, there's no extra requirement to heat up the motor with electricity. According to this invention, the current detection circuit 10 valuates the completion time of heating to pour out the resting refrigerant, and it is geared to conserve energy.

Figure 3:
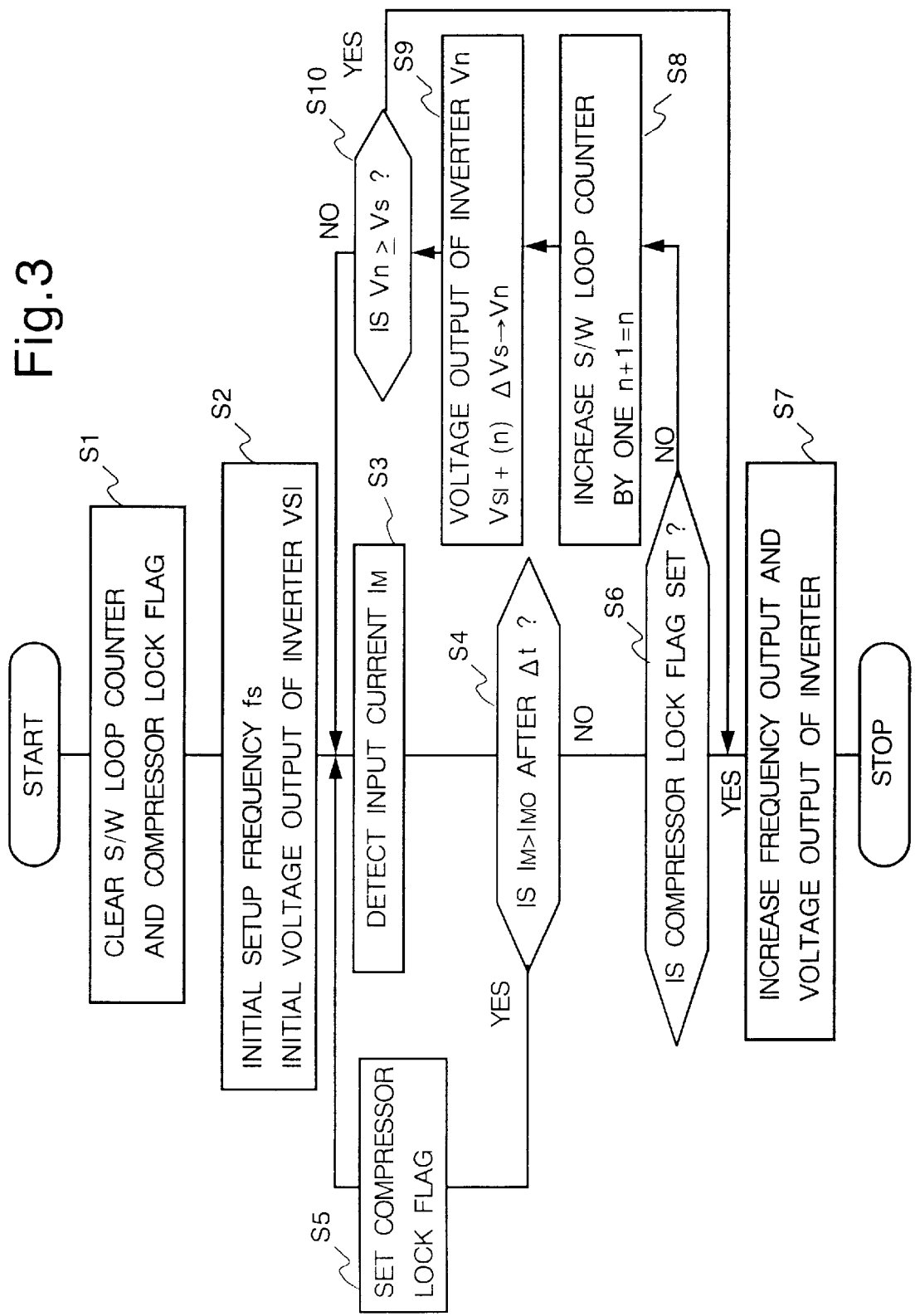
FIG. 3 shows the operational flow chart of control unit of refrigerating machine of embodiment 1.
Figure 4:
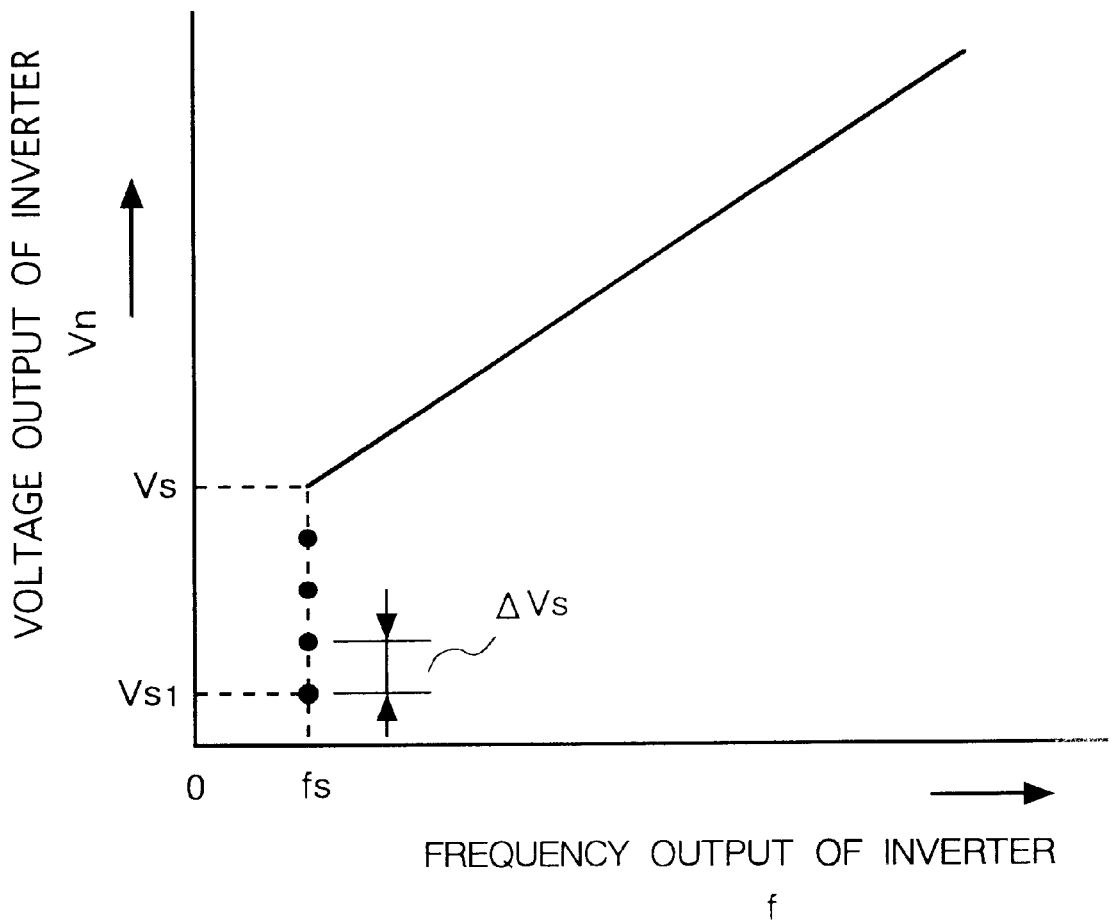
FIG. 4 shows the characteristic diagram of start-up inverter output V/F of control unit of refrigerating machine of embodiment 1.

Followings are detailed explanations, referring to FIGS. 3, 4 and 5, on the start-up control operation.

FIG. 3 shows a control flow chart at start-up. FIG. 4 is a graph on the start-up characteristic of voltage output of inverter, showing the relation of: voltage output of inverter/ frequency output of inverter (V/f). FIGS. 5(a)–5(d) are time charts at normal start-up.

To start with step S1, as FIG. 3 shows, in order to set the initial values of software (S/W) loop counter and compressor lock flag, the start-up control circuit 9 clears the counter and the lock flag based on starting signal from the compressor. What is meant by "lock" of the compressor is, it is a situation when the motor of the compressor is not rotating. The lock flag is a flag that indicates that the compressor is not rotating even if there's sufficient electricity running to start the compressor.

In step S2, the compressor is started at the initial setup value, that is, as explained previously, the compressor starts at VS1/fs (voltage output of inverter/frequency output of inverter).

In step S3, the frequency output fs is maintained, and detect the input current IM after Δt.

In step S4, valuate whether or not if the detected input current IM had exceeded the setup current level IMO. Here, the setup current level IMO is a level of the current required to switch the compressor from the locking to the rotating mode. That is, it is the level of current required to start a rotation of the motor of compressor. Also, the setup current level IMO can be used to indicate abnormality in a motor, if the motor does not rotate even after the current has reached the excess level.

Based on the results of valuation, in an excess case (IM>IMO), the voltage output will not be increased and advances to step S5 which sets the lock flag to maintain the situation, and for a case when not in excess (IM≦IMO), proceed to step S6 which is a step to valuate whether lock flag is being set or not.

Previously mentioned initial voltage output VS1 is set at low level to start with so initially, the input current IM is always below the setup current level IMO, therefore, the first valuation always leads to step S6.

In step S6, the lock flag is checked. When the lock flag is not set yet it advances to step S8. The loop counter n is increased by 1 (n+1=n), and advances to next step.

Numeral n is a counter number.

In step S9, for every increase in the loop counter by 1, the voltage output of inverter VS1 is raised by ΔVS only. That is, the voltage output of inverter Vn is VS1+(n)ΔVS.

Step S10 valuates VS1+(n)ΔVS whether it has reached previously set driving voltage Vs shown in FIG. 4. If it has, it is functioning normally and will go to step S7. After that, operation of compressor is controlled by the voltage output and the frequency output of inverter depending on loads. If VS1+(n)ΔVS has not reached the previously set driving voltage Vs, it will go to step S3. After that it is a repetition from step S3 to step S10.

Figure 2C:
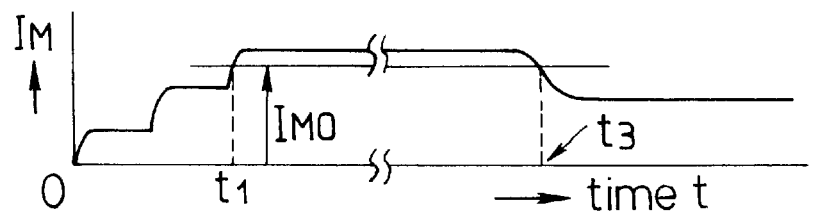
Figure 2D:
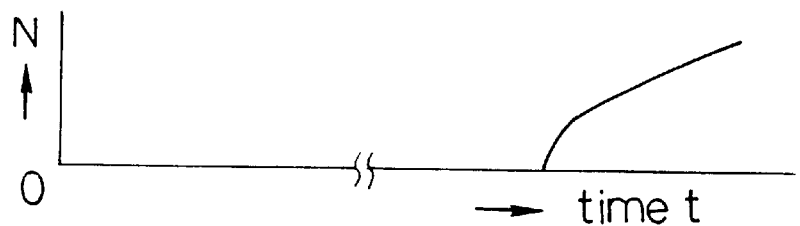

During the repetition of step S3 to step S10, at step S4 when the detected input current IM has been valuated to exceed the value of setup current level IMO (time t3 of FIG. 2(c), go to step S5. What is meant by the detected input current IM exceeding the value of setup current level IMO is, the motor is unable to rotate due to low temperature and abundant amount of resting refrigerant.

Figure 5A:
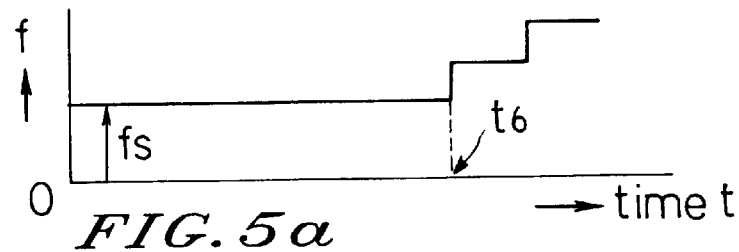
FIGS. 5(a)–5(d) are time charts of control unit of refrigerating machine of embodiment 1.
Figure 5B:
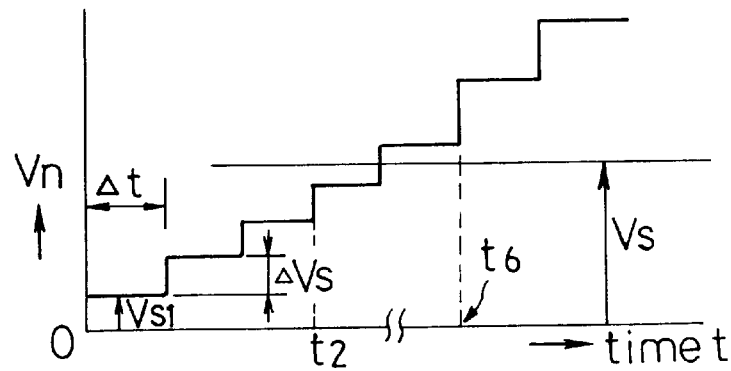
Figure 5C:
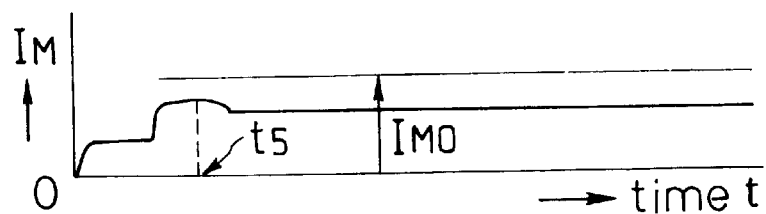
Figure 5D:
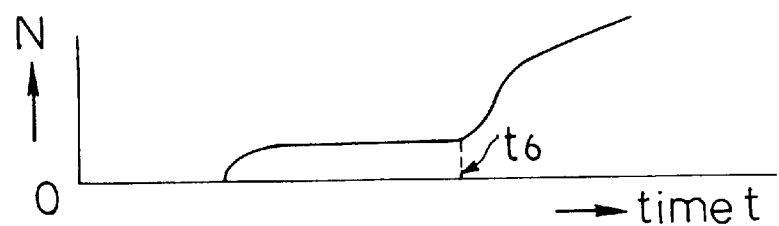
Figure 6A:
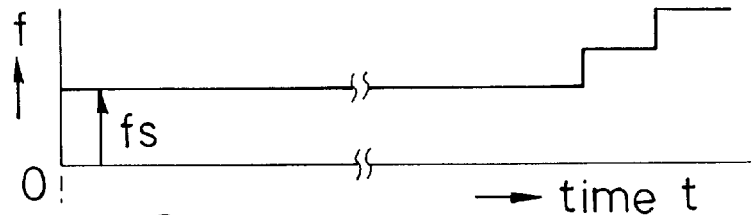
FIGS. 6(a)–6(d) are time charts of control unit of refrigerating machine of embodiment 1.
Figure 6B:
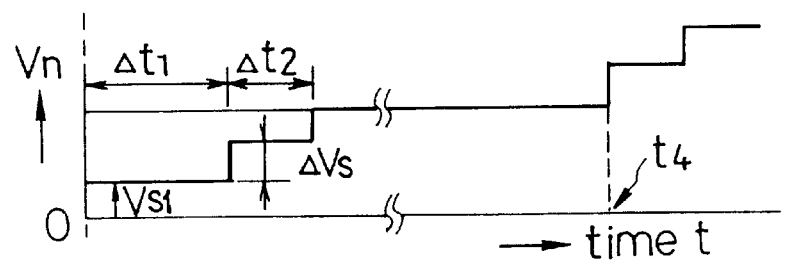
Figure 6C:
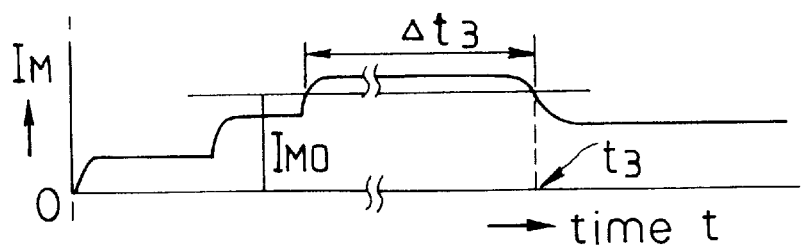
Figure 6D:
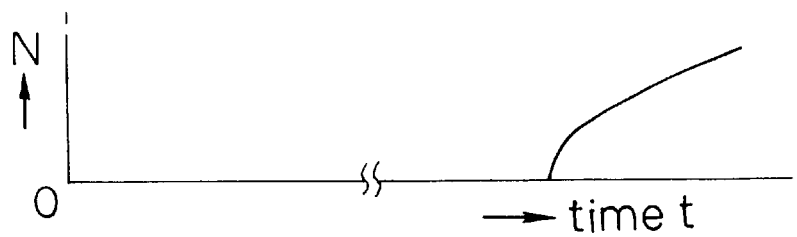
Figure 7A:
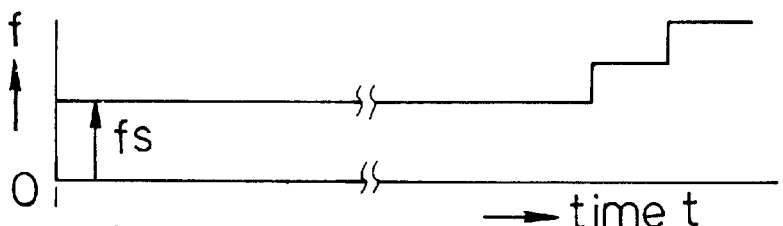
FIGS. 7(a)–7(d) are time charts of the control unit of refrigerating machine of embodiment 1.
Figure 7B:
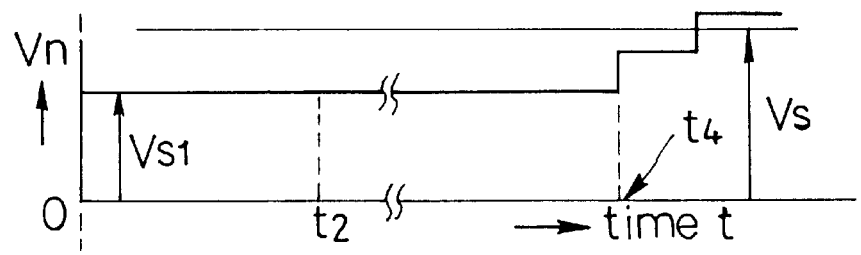
Figure 7C:
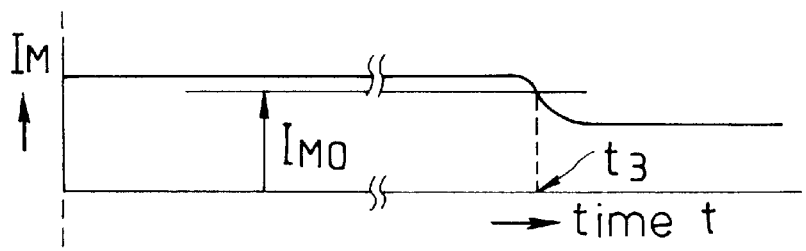
Figure 7D:
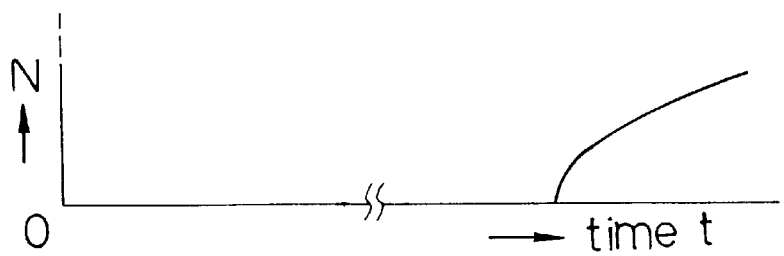

When the motor begins to rotate during the repetition of step S3 to step S10, this means that the motor has started normally without the input current IM having to exceed the setup current level IMO. For example, as FIG. 5(c) shows, when the motor starts to rotate at time t5, the input current IM remains low. And when step S3 to step S10 continues to repeat in this situation, Vn>Vs occurs at time t6 as shown in FIG. 5(b). When the voltage output of inverter Vn equals the previously set driving voltage Vs as described previously, it will go from step S10 to step S7, and the operation of compressor is controlled by the voltage output of inverter and the frequency output of inverter depending on loads. Therefore, if went from step S10 to step S7, it is the case of normal function without the input current IM having to exceed the setup current level IMO.

If the motor failed to rotate as normal the lock flag is set at step S5. Then returns to step S3 as done so in FIGS. 2(a)–2(d), without increasing the voltage output. After time Δt, the current input IM is detected in step S3 and again in step S4 repeats the step of valuation whether or not if the detected input current IM exceeded the setup current level IMO. During the process of repetition, when the detected input current IM is below the setup current level IMO (time t4 in FIG. 2(c), that means the motor in locking mode is heated up by running of electricity and the temperature of lubricant is increased which decreases the viscosity causing the decline in fricitional resistance of each abrasive part to begin the rotation of compressor, and eventually decreasing the input current IM. When the input current IM is valuated to be below the setup current level IMO, go to step S6, and in this step, the lock flag is checked. As the lock flag has been set, it goes to step S7 where compressor operation for the voltage output of inverter and the frequency output of inverter are controlled depending on loads. As such, heating completes when the current has been detected and the motor starts to rotate. In other words, the heating can be done in the exact time needed. This is quite different from the conventional method where heating time was exactly for 3 minutes or for a fixed time period t.

As explained above, the voltage VS1 of the initial frequency fs is increased for every Δt, however, it can also be for a predetermined time. For example, as FIGS. 6(a)–6(d) show, if set the time to be longer to start with and then shorter next (Δt1>Δt2), time Δt3 can be made shorter, which is the time period of excess current flow at above the setup current level IMO to raise the coil temperature. Therefore, the resting refrigerant will be poured out under the most safe condition and the credibility of refrigerating machine increases.

As FIGS. 7(a)–7(d) show, when the voltage VS1 for the initial frequency fs is below the driving voltage Vs, there's no problem for the initial input current IM being in excess to the setup current level IMO. In such a case, as with the flow chart shown in FIG. 3, the steps from S8 to S10 are skipped, and the start-up is controlled within step S1 to step S7.

Embodiment 2

The embodiment 2 of this invention is explained below.

Figure 8:
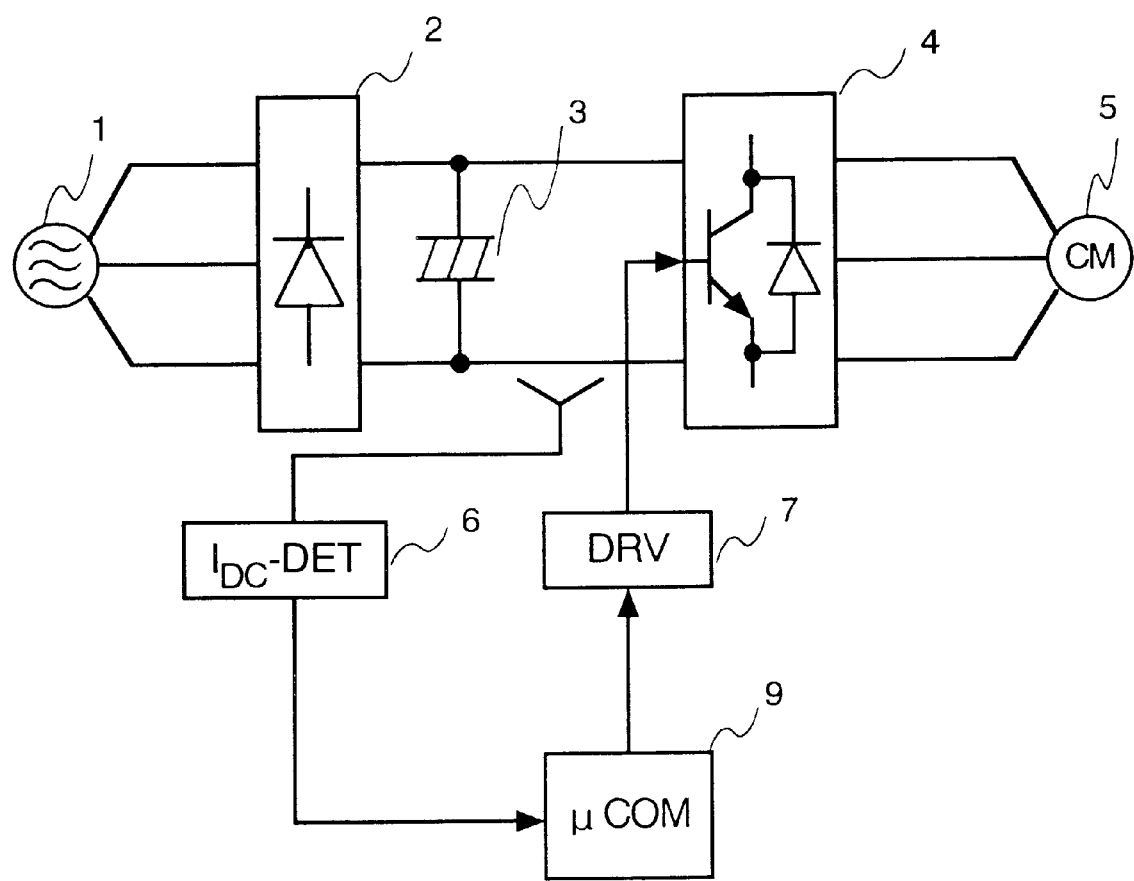
FIG. 8 shows the configuration of refrigerating machine for embodiment 2.

FIG. 8 shows a configuration for the embodiment 2. In this figure, 6 is DC-line current detection circuit that protects excess current of DC-line inverter element. The detailed explanation of all other parts are as explained in the embodiment 1.

FIGS. 9(a)–9(d) are time charts for the start-up of compressor for the embodiment 2. The horizontal axis of FIGS. 9(a)–9(d) on the charts indicate time lapsed; and the vertical axis of FIGS. 9(a)–9(d) correspond to frequency output of inverter, voltage output of inverter, DC-line current and rotation of compressor respectively.

The operation is explained below.

As the figures shows, outputs are made to the compressor. The initial setup value of frequency fs as frequency output of inverter, and the initial setup value for voltage VS1 as voltage output of inverter.

On starting, the frequency output fs is maintained until the compressor is started.

Maintaining the situation, the DC-line current detection circuit 6 detects DC-line current IDC from the compressor in locking mode for every Δt. For every Δt the voltage output VS1 is raised by ΔVS until time t1. The detected DC-line current IDC exceeds a setup level value of DC-line current IDCO at time t1. The level value of DC-line current IDCO is a required level to move from the locking mode to the rotating mode.

After the DC-line current IDC has exceeded the level value of DC-line current IDCO, maintain the frequency output, and stop increasing the voltage output.

Figure 9A:
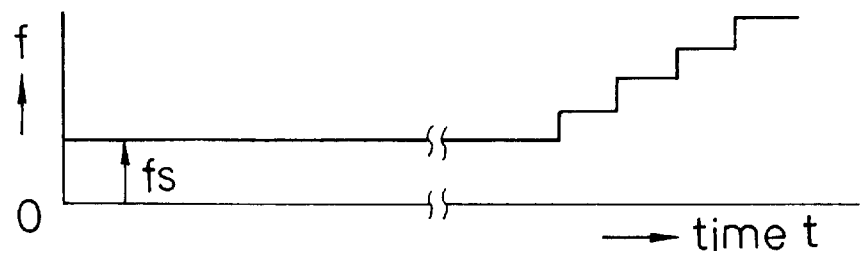
FIGS. 9(a)–9(d) are time charts of the control unit of refrigerating machine for embodiment 2.
Figure 9B:
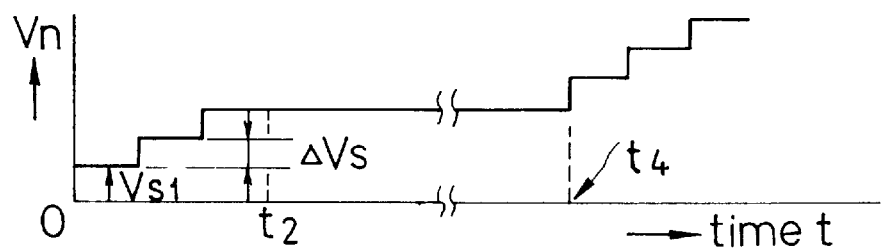
Figure 9C:
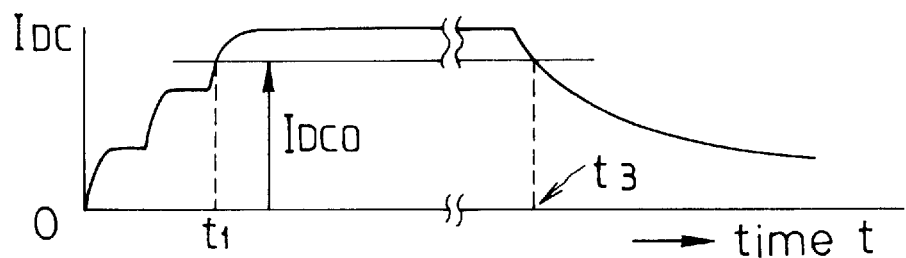
Figure 9D:
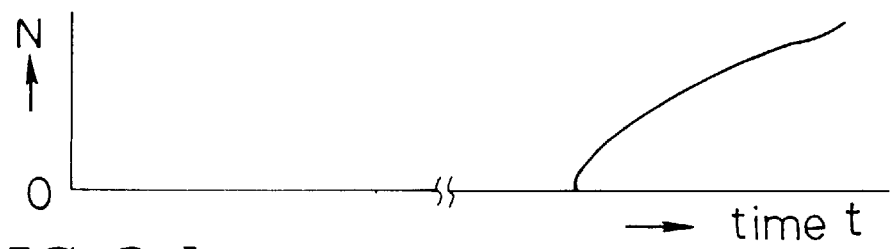

By supplying electricity as maintaining the frequency output, the motor of compressor heats up which can increase the temperature of lubricant, causing decline in viscosity to cause decrease in the frictional resistance of abrasive parts. Then the compressor begins to rotate and the DC-line current IDC decreases to below the setup level value of DC-line current IDCO at time t3. At time t4 after time Δt has lapsed, as shown in FIGS. 9(a) and 9(b), the frequency output of inverter and the voltage output of inverter are increased which will control a number of rotations (frequency) of the compressor depending on loads.

That is, for embodiment 2, in place of the current detection circuit of embodiment 1, DC-line current detection circuit 6 is used. The DC-line current detection circuit 6 valuates driving based on detection from DC-line current of inverter. A measure of valuation had simply been substituted from the input current for compressor IM to the DC-line current for inverter IDC. All other mechanisms are as explained in the embodiment 1, therefore, the explanation on operational flow is omitted.

Embodiment 3

The embodiment 3 of this invention is explained below.

Figure 10:
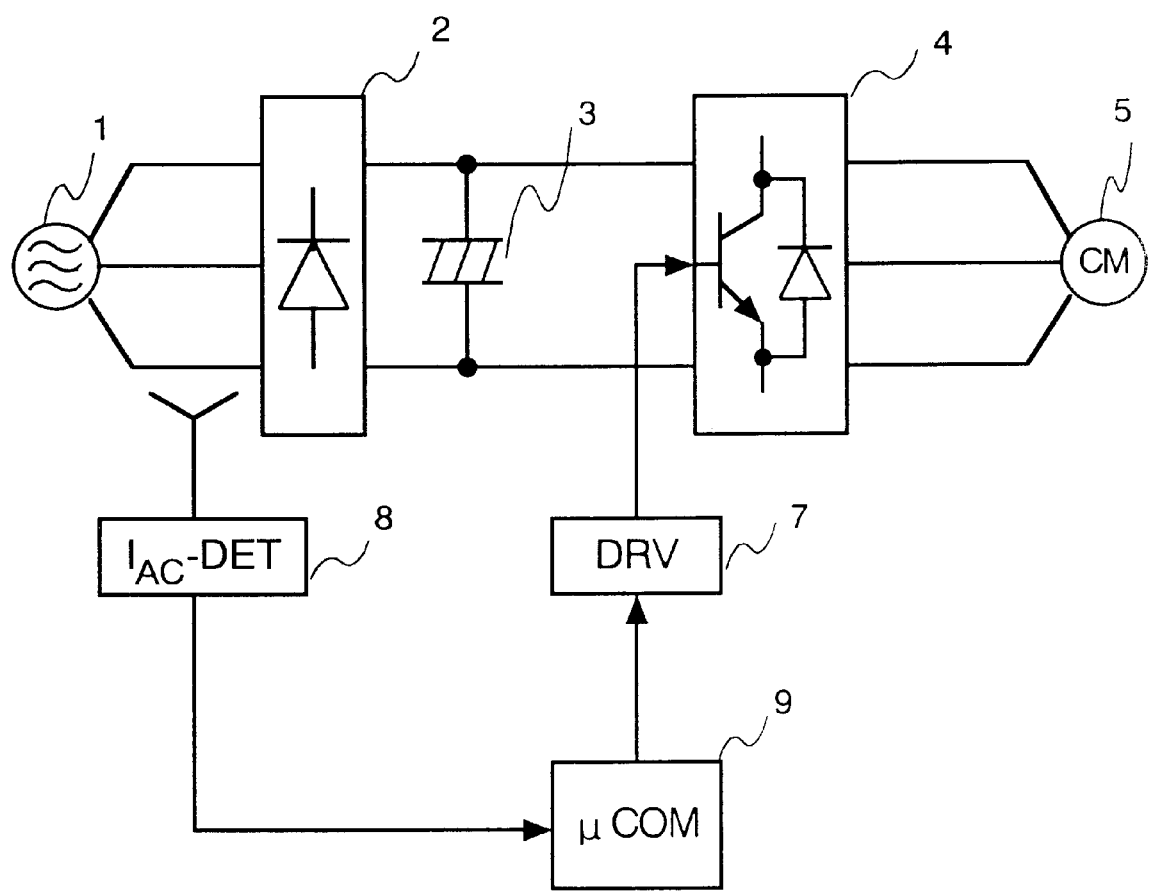
FIG. 10 shows the configuration of refrigerating machine for embodiment 3.
Figure 11A:
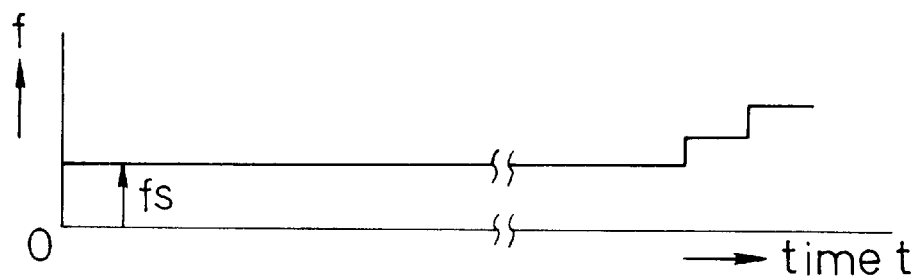
FIGS. 11(a)–11(d) are time charts of the control unit of refrigerating machine for embodiment 3.
Figure 11B:
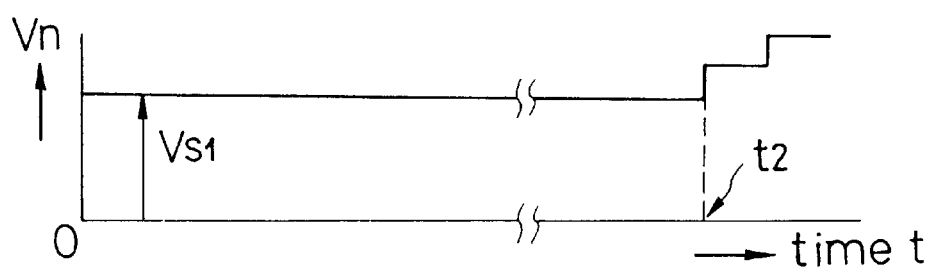
Figure 11C:
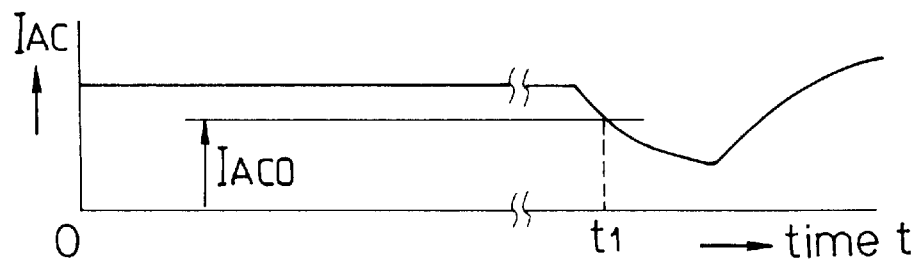
Figure 11D:
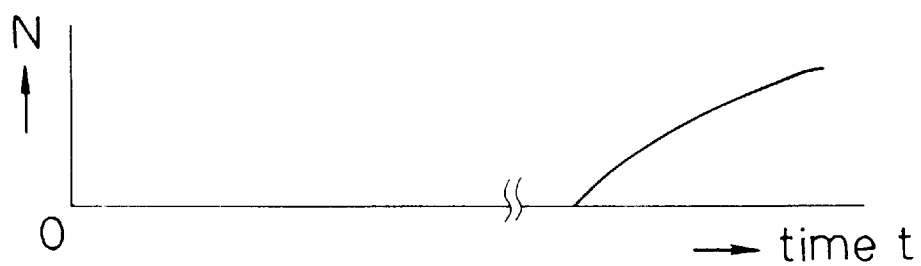

FIG. 10 shows a configuration of the embodiment 3. In the figure, 8 is a power-supplied input current detection circuit that detects power-supplied input current. Other parts of the configuration are as explained in the embodiment 1, therefore, the detailed explanation is omitted.

FIGS. 11(a)–11(d) are time charts on the start-up of compressor for the embodiment 3. The horizontal axis of the charts in FIGS. 11(a)–11(d) indicate time and the vertical axis of FIGS 11(a)–11(d) correspond to frequency output of inverter, voltage output of inverter, power-supplied input current and a number of rotations of compressor respectively.

For the embodiment 3, in place of the current detection circuit for compressor of the embodiment 1 the power-supplied input current detection circuit 8 is used. The power-supplied input current detection circuit 8 valuates driving of the compressor based on power-supplied input current IAC. A measure of valuation had simply been substituted from the input current for compressor IM to the power-supplied input current IAC.

As FIGS. 11(a)–11(d) show, on start-up, outputs are made to the compressor. As the frequency output of inverter the initial setup value of frequency fs, and as voltage output of inverter the initial setup value of voltage VS1. On starting, the frequency output fs and the initial setup value for voltage VS1 are maintained until the compressor starts to rotate. Maintaining the situation, detect power-supplied input current IAC, and when the detected power-supplied current IAC is exceeding the previously set level value of power-supplied input setup current IACO, maintain this situation. The compressor rotates and the power-supplied current IAC decreases to below the power-supplied input setup current IACO at time t1. At time t2 after time Δt has lasped the frequency output of inverter and the voltage output of inverter are increased.

Embodiment 4

The embodiment 4 of this invention is explained below.

Figure 12:
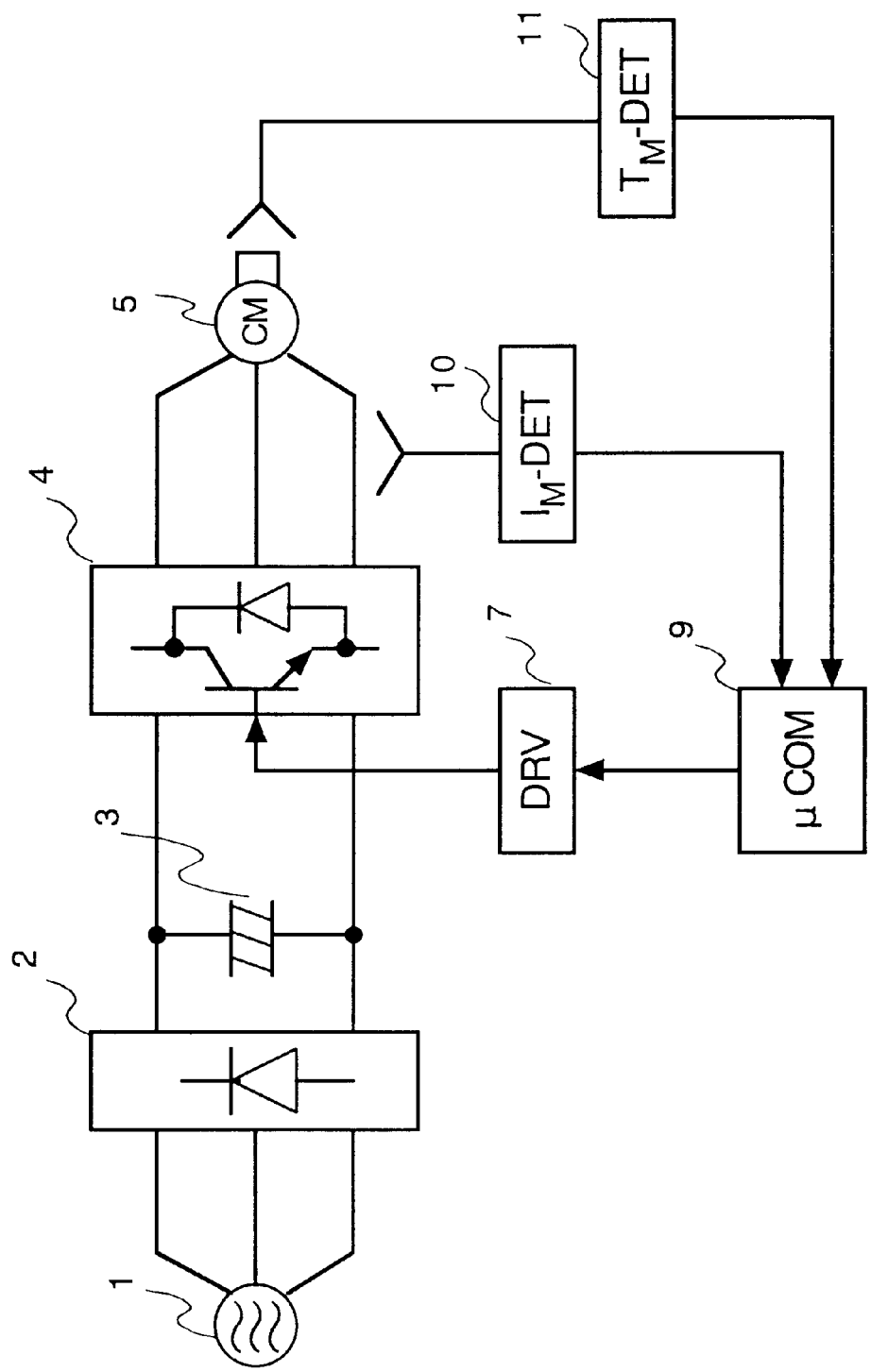
FIG. 12 shows the configuration of control unit of refrigerating machine for embodiment 4.
Figure 13A:
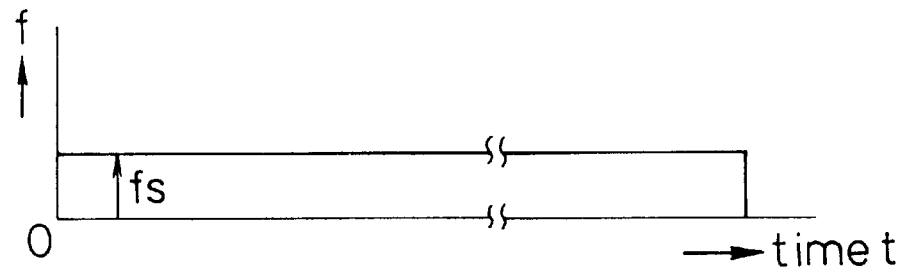
FIGS. 13(a)–13(d) are time charts of the control unit of refrigerating machine for embodiment 4.
Figure 13B:
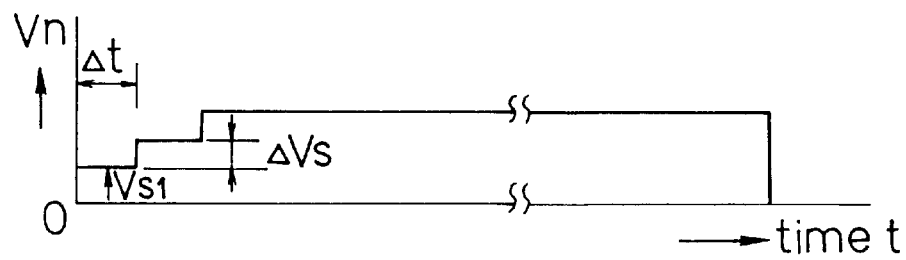
Figure 13C:
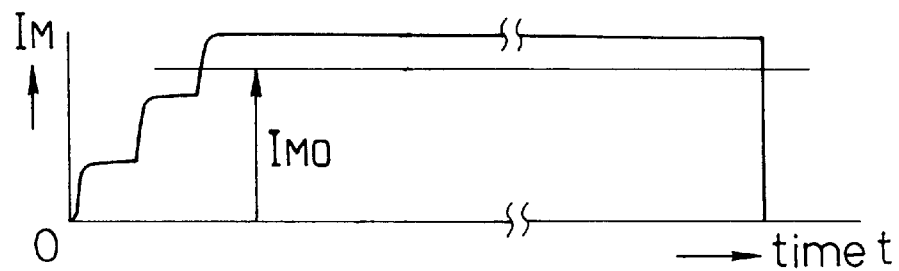
Figure 13D:
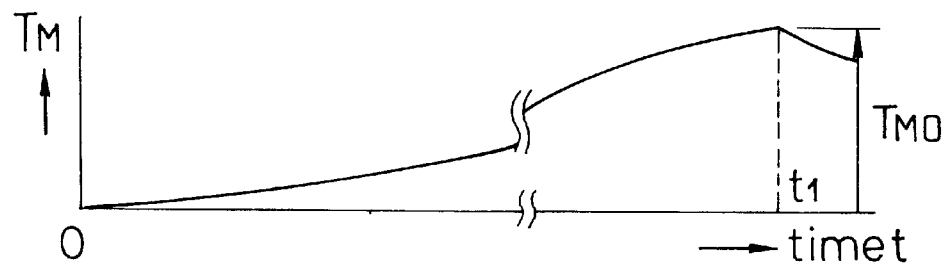

FIG. 12 shows a configuration of the control unit for embodiment 4. In the figure, 11 is a temperature sensor which measures the motor temperature in the compressor. All other parts in this configuration are as described in the embodiment 1, therefore, the detailed explanation is omitted.

Similarly, FIGS. 13(a)–13(d) are time charts on the start-up of compressor for the embodiment 4. The horizontal axis of the charts in FIGS. 13(a)–13(d) indicate time and the vertical axis of FIGS. 13(a)–13(d) correspond to the frequency output of inverter, and the motor temperature of compressor respectively. FIGS. 13(a)–13(d) show a case when the motor temperature TM, which is detected by the temperature sensor 11, had become greater than the highest setup temperature TMO before the compressor rotation.

Following is the explanation of a case when the motor temperature measured by the temperature sensor 11 that has not become greater than the highest set temperature TMO. In this case, the operation is similar to the previously described case in FIG. 2. As FIG. 2 shows, on start-up, outputs are made to the compressor. As the frequency output of inverter the initial setup value of frequency fs, and as voltage output of inverter the initial setup value of voltage VS1. On starting, the frequency output fs and the initial setup value for voltage VS1 are maintained until the compressor starts to rotate.

When the motor temperature TM measured by the temperature sensor 11 has not reached the temperature greater than the highest set temperature TMO, which is a fixed temperature as a protection temperature of the coil in motor, the current detection circuit 10 detects the input current of compressor IM in the locking mode for every Δt, and until the detected input current for compressor IM exceeds the previously set value of setup current level IMO at time t1, the voltage output VS1 at the control unit is increased by ΔVS for every Δt.

After the input current of compressor IM has exceeded the setup current level IMO, a voltage increase for the output voltage is terminated, and the situation is maintained if the motor temperature TM measured by the temperature sensor has not reached the highest set temperature TMO.

By supplying the electricity maintaining this situation, the motor inside the compressor heats up which causes the temperature of lubricant to increase, leading to a decrease in its viscosity, which in turn will causes decline in the frictional resistance of abrasive parts and the compressor begins to rotate. When the detected input current of compressor IM decreases to below the setup current level IMO after time Δt at time t3, the voltage output of inverter and the frequency output of inverter are increased at time t4 as shown in FIGS. 2(*a*) and 2(*b*), this can control a number of rotations (frequency) of the compressor depending on loads.

If the compressor is unable to rotate and when the motor temperature TM measured by the temperature sensor 11 had became greater than the highest set temperature TMO, there are three controlling methods as below.

A control method one is to block inverter output as shown in time t1 of FIGS. 13(*a*)–13(*d*).

A control method two is, following the blockage of output inverter as of the control method one, after a fixed time has lapsed from time t1 when the motor temperature had become lower than the lowest set temperature, return to the start (time t=0).

A control method three is, when the motor temperature measured by the temperature sensor 11 is greater than the highest set temperature, the compressor is assumed that it has an adequate heat. The voltage output and frequency output of inverter are increased to control the rotation (frequency) of compressor, depending on loads.

Figure 14:
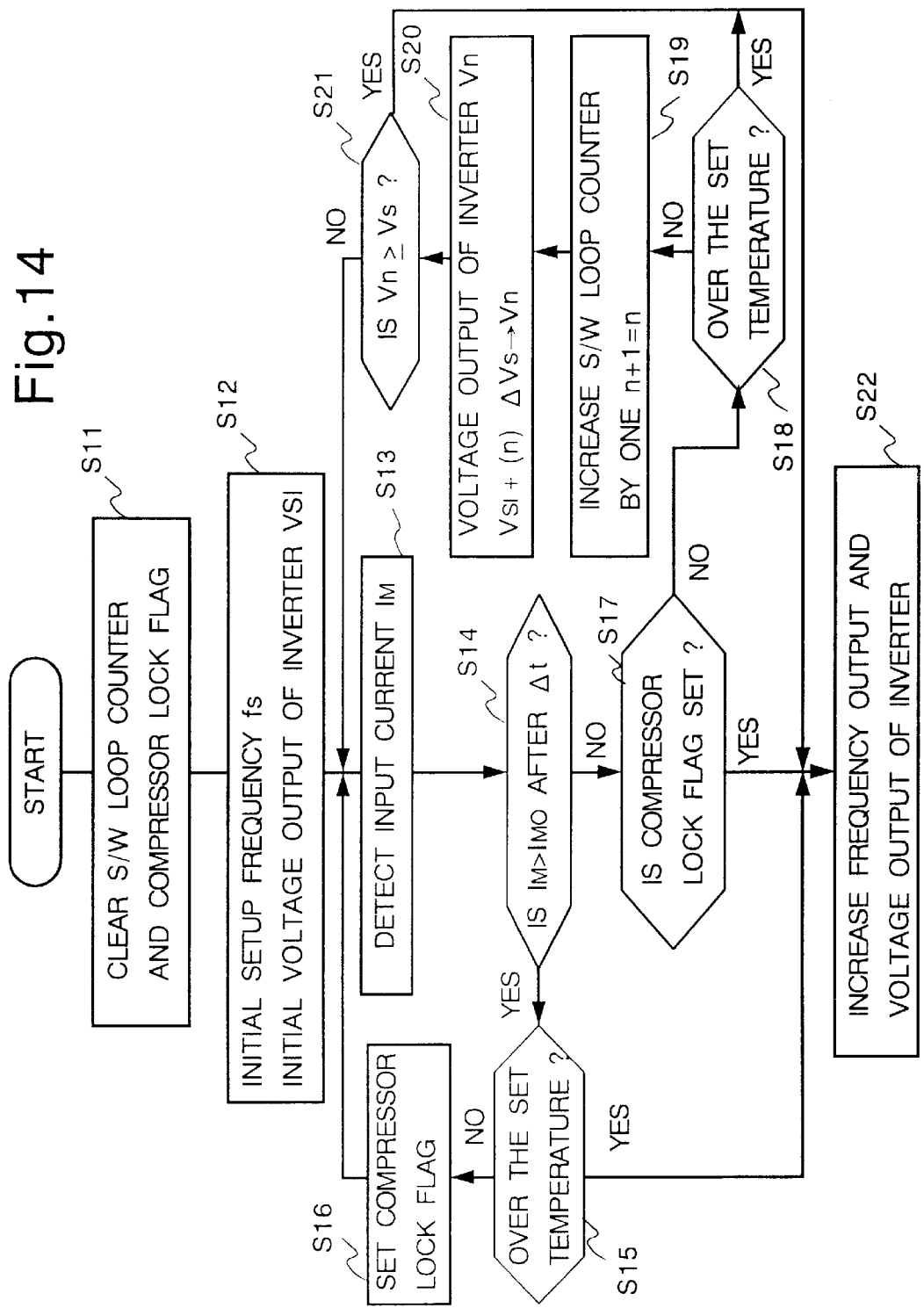
FIG. 14 shows the operational flow chart of control unit of refrigerating machine for embodiment 4.

Next, among the previously described start-up control methods, the control method 3 is explained in detail using FIG. 14.

FIG. 14 is an operational flow chart on controlled start-up for the embodiment 4.

As FIG. 14 shows in step S11 the start-up control unit 9 clears the lock flag and the counter based on the starting signal of compressor in order to set initial values of the software (S/W) loop counter and the compressor lock flag.

In step S12, the compressor starts at the initial setup value, that is, as described previously, the compressor starts at; VS1/fs (voltage output of inverter/frequency output of inverter).

In step S13, under the maintained frequency output fs, the input current for compressor IM is detected after time Δt.

Step S14 valuates whether the detected input current of compressor IM had exceeded or not the setup current level IMO.

From the initial valuation result where lock flag is unset and if IM>IMO, go to step S15, and if IM≦IMO, then go to step S17 to determine if lock flag is set or unset.

As described previously, initially, the initial voltage output VS1 is set so the initial input current for compressor IM is always below the setup current level IMO, therefore, goes to step S17.

In step S17, the lock flag is unset so proceed to step S18 and see if the motor temperature of the compressor is greater or smaller than the highest set temperature. If the temperature is greater than the highest set temperature, the lubricant is sufficiently warm inside the compressor, so proceed to step S22, and the voltage output and frequency output of inverter are increased to control the rotation (frequency) depending on loads.

However, if the motor temperature of the compressor is below the highest set temperature, go to step S19 to increase the loop counter by one, then proceed to step S20.

In step S20, for every increase in the loop counter by one, increase the voltage output of inverter VS1 by ΔVS;. That is, voltage output of inverter Vn is VS1+(n)ΔVS.

Numeral n is the counter number.

In step S21, VS1+(n)ΔVS valuates whether or not if it has reached the previously set driving voltage Vs. If it has, go to step S22 to control the operation for the voltage output of inverter and frequency output of inverter of compressor depending on loads.

If VS1+(n)ΔVS has not reached previously set driving voltage Vs, go to step S20 to repeat steps S13 to step S20.

When the voltage output of inverter Vn became the same value as the previously set driving voltage Vs during the repetition, as described before, go to step S22 to control the operation of the voltage output of inverter and frequency output of inverter of compressor depending or, loads.

While repeating the steps S13 to S20, if the input current of compressor IM detected in step S14 exceeded the setup current level IMO, go to step S15.

As shown in the flow chart, at step S15, the motor temperature of compressor is measured to see if the temperature is over or under the highest set temperature. From a result of the measurement, if it is over the highest set temperature, the lubricant inside the compressor is sufficiently warm meaning there's no resting refrigerant, so proceed to step S22 to increase the frequency output of inverter and the output voltage of inverter, and control a number of rotations (frequency) of compressor depending on loads.

On contrary, when the motor temperature is below the highest set temperature, the voltage output remains intact and go to step S16 to set the lock flag to maintain the situation then returns to step S13 to re-detect the input current of compressor IM after time Δt. At step S14 repeat the valuation if the input current IM has exceeded the setup current level IMO.

During the repetition when the input current for compressor IM was below the setup current level IMO, that is, during a fixed voltage output at the locking mode, the motor of compressor is heated causing the increase in lubricant temperature and a decrease in its viscosity leading to a decline in frictional resistance of the abrasive parts. When the compressor rotation starts, and if the input current of compressor IM decreases to below the setup current level IMO, go to step S17 to valuate that the lock flag is set at the fixed voltage output so proceed to step S22 to control the operation of the voltage output and the frequency output of inverter of compressor, depending on loads.

In the previous explanation the voltage VS1 of the initial frequency fs was increased for every Δt but it can also be for a fixed time. For instance, if set the time so that it is longer in duration to start with, followed by shorter duration, so that time period between excess current flow can be made shorter when raising coil temperature that this is much a safer way to pour out the resting refrigerant.

When the voltage VS1 of the initial frequency fs is below the driving voltage, there's no problem for the initial current of compressor exceeding the setup current level IMO.

In the previous explanation, the temperature sensor 11 measures the motor temperature of compressor to valuate whether or not if the measured temperature is over the highest set temperature. The temperature sensor 11 can be set to measure the temperature of lubricant that is appropriate as the motor temperature of compressor, or as a shell temperature of compressor, and either one of these can be the basis of valuation to valuate if the motor temperature had become over the highest set temperature.

Alternatively, instead of measuring the temperature using the temperature sensor 11, can adopt temperature counter using a timer (not illustrated) or alternatively, can use a software program for counting a period of time between power off to power on mode of the compressor. That is, for step S15 or S18, if the period of time between the power off to power on of the compressor is below the pre-setted time, the compressor is still warm, and can proceed to step S22.

Figure 15:
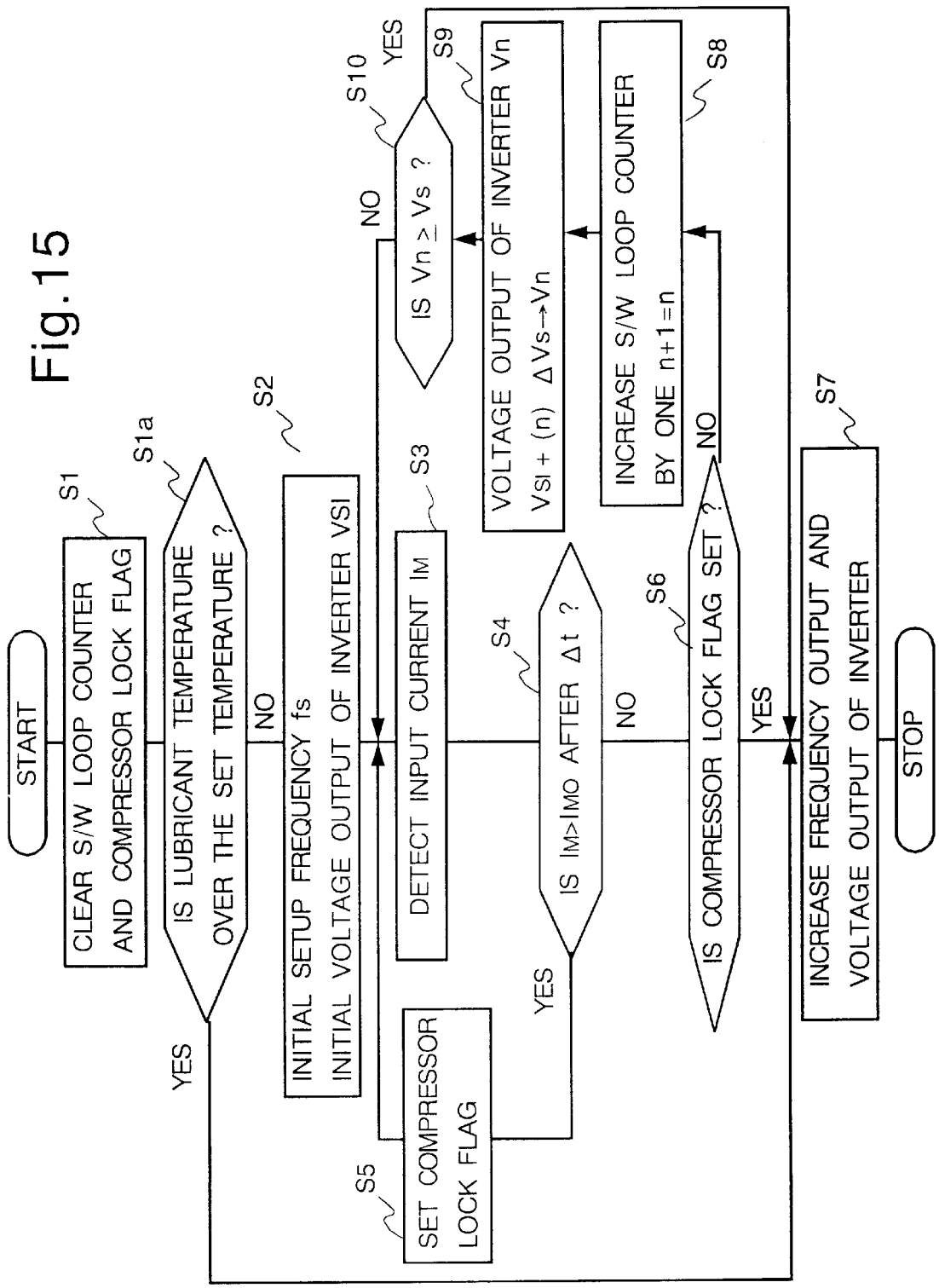
FIG. 15 shows the operational flow chart of control unit of refrigerating machine for embodiment 4.

When a starting signal appears in the compressor, based on the temperature reading of the temperature sensor 11, if the temperature characteristic value which is equivalent to the motor temperature of compressor is over the highest set temperature, the control circuit can be made not to start at the initial set value VS1/fs. For example, as FIG. 15 shows, step 1a is inserted between step S1 and S2. At step S1a, the temperature characteristic value that corresponds to the motor temperature of the compressor (e.g. temperature of lubricant in the compressor), is checked whether it is over or under the highest set temperature. If the temperature characteristic value is over the highest set temperature, proceed to step S7 as in FIG. 15. If the temperature characteristic value is under the highest set temperature, go to step S2, so that if the temperature of lubricant is low, that is, a temperature when the amount of resting refrigerant is large inside the compressor, the refrigerant must be heated. When the temperature of refrigerant is high, that is, a temperature when the amount of resting refrigernat is low, the unnecessary heating will not take place. By doing so it helps to prevent the deterioration of lubricant to provide the control unit of refrigerating machine that are economically sound and high in credibility.

Embodiment 5

The embodiment 5 of the invention is explained below.

Figure 16:
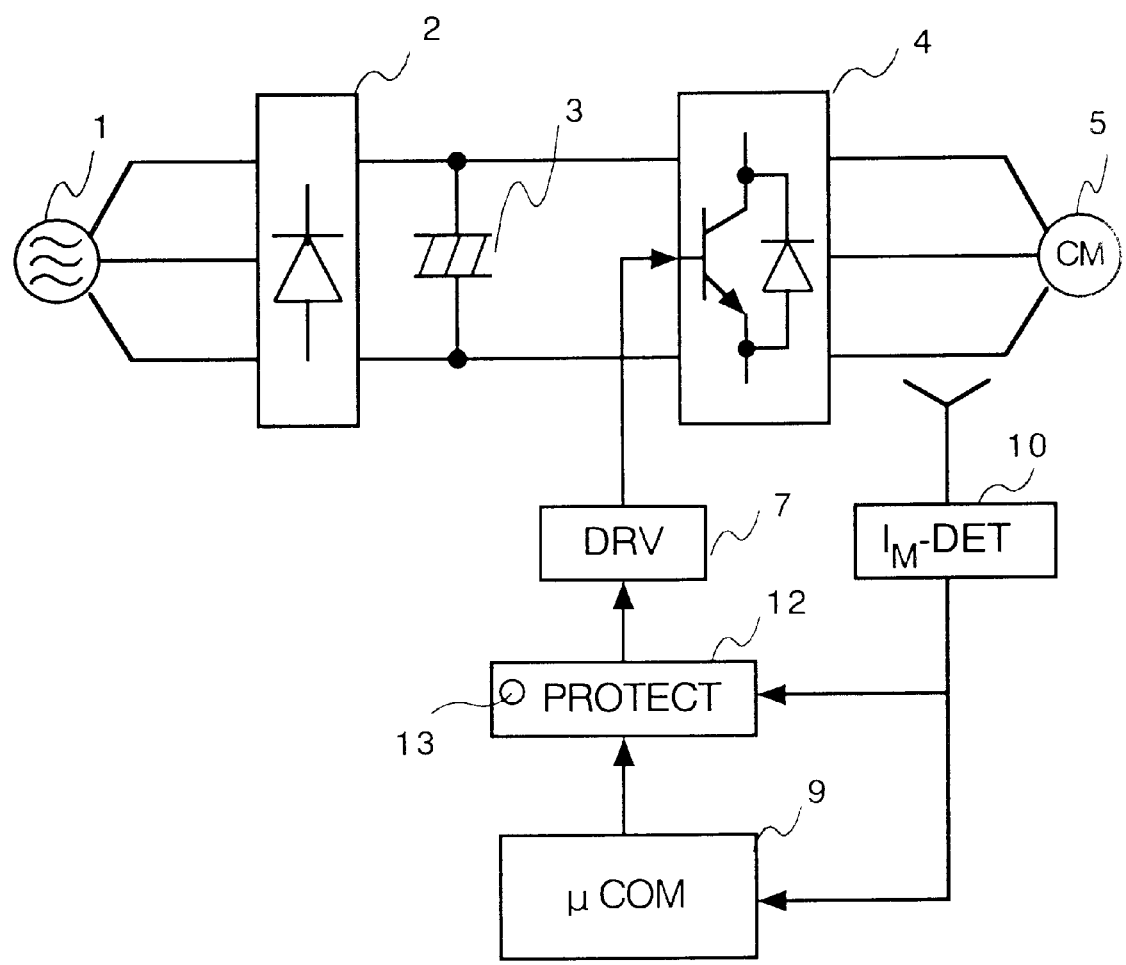
FIG. 16 shows the configuration of control unit of refrigerating machine for embodiment 5.
Figure 17A:
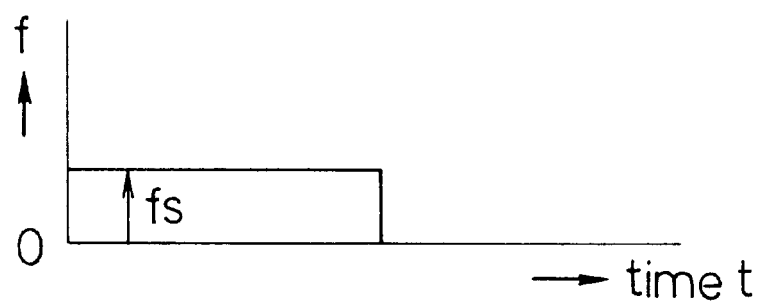
FIGS. 17(a)–17(c) are time charts of the control unit of refrigerating machine for embodiment 5.
Figure 17B:
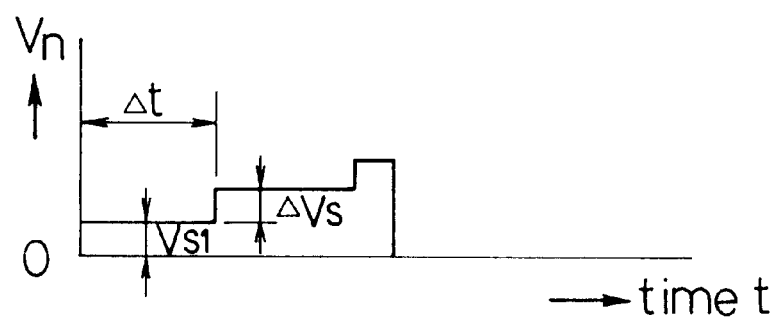
Figure 17C:
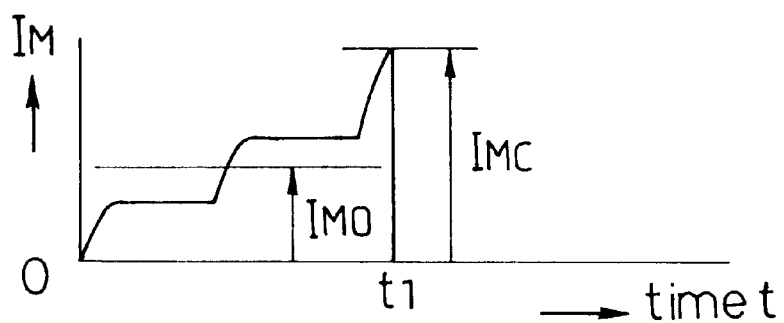
Figure 18:
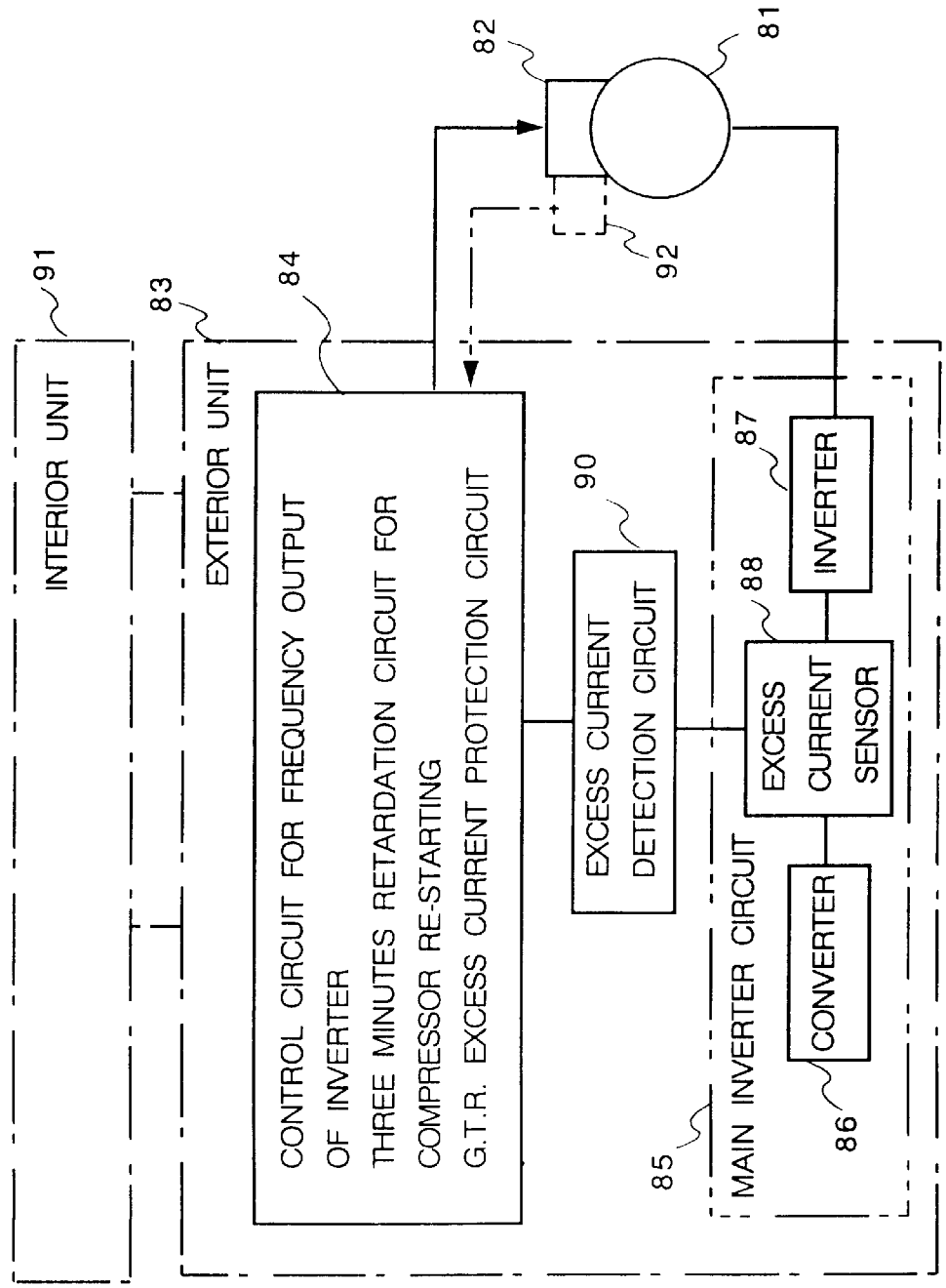
FIG. 18 shows the operational flow chart of control unit of Related Art 1.
Figure 19:
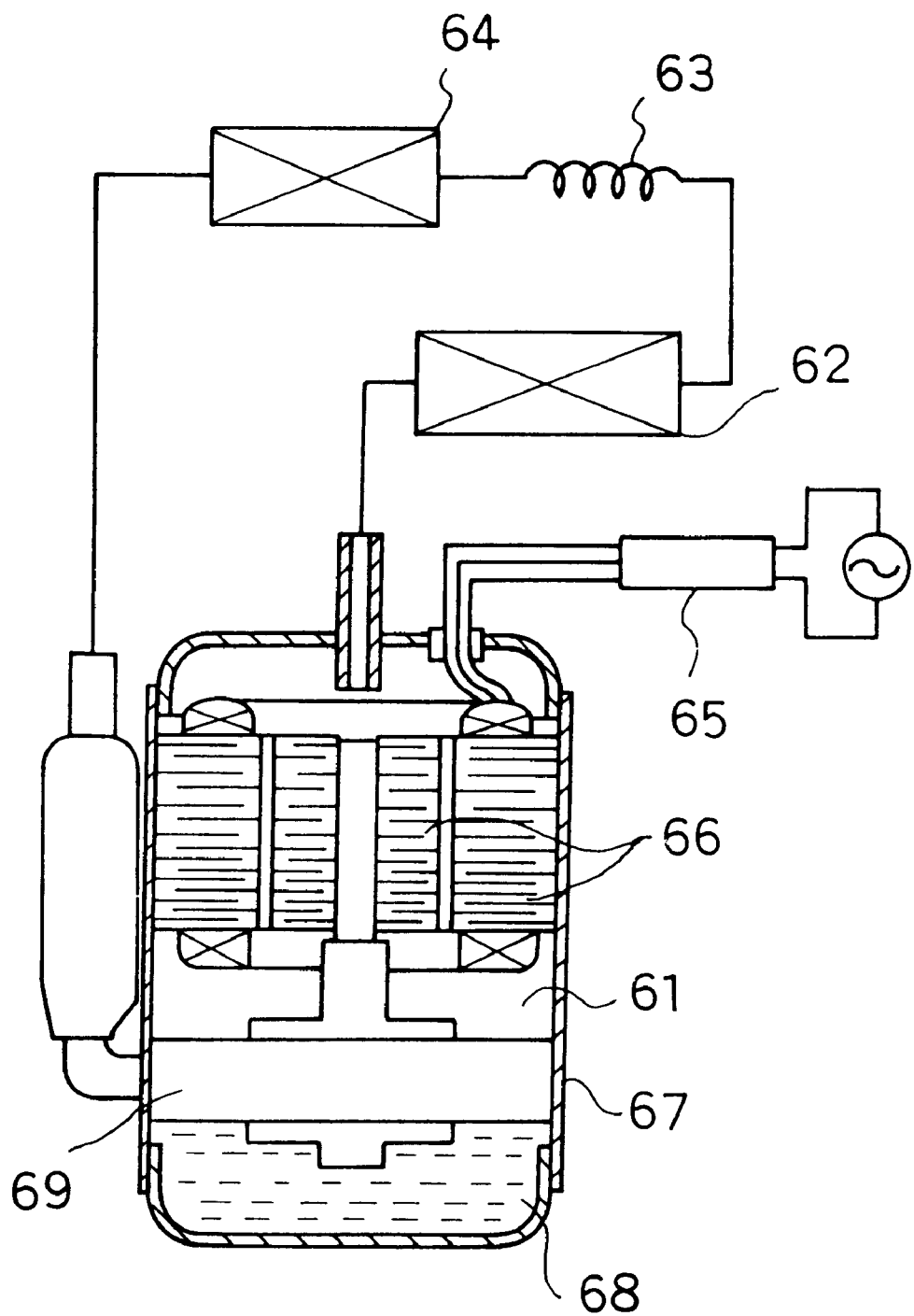
FIG. 19 shows the refrigerating cycle of air-conditioner from Related Art 2 provided with operating control unit.
Figure 20:
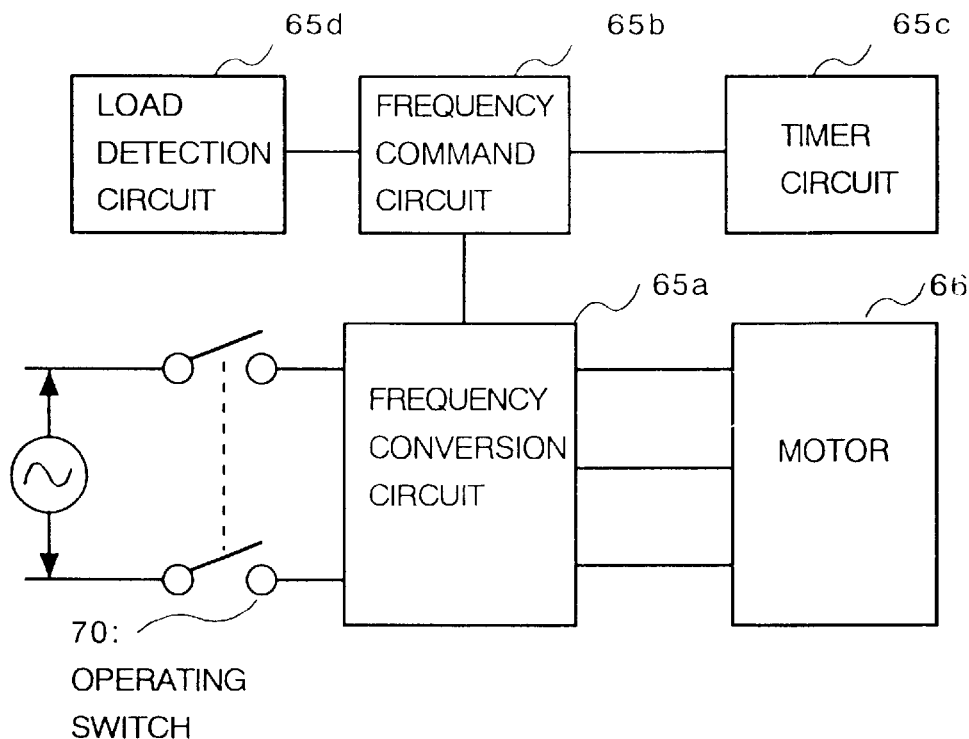
FIG. 20 shows the configuration of operating control unit for air-conditioner of Related Art 2.
Figure 21:
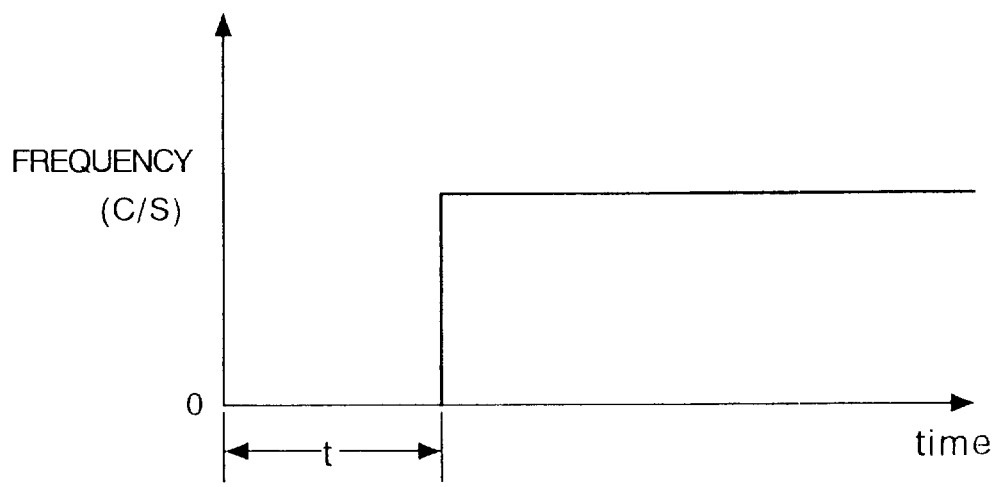
FIG. 21 shows the characteristic of frequency output of operating control unit for air-conditioner of Related Art 2.

FIG. 16 shows a configuration of the embodiment 5. FIGS. 17(a)–17(c) are time charts of the start-up control unit for the embodiment 5. As the figure shows, for the embodiment 5, when the current value that are equivalent to the input current of compressor IM of embodiment 1 has reached a protection level value of excess current IMC, it has a danger to damage an insulation of motor in the compressor having the setup current level IMO for some reason. To protect the insulation of the motor of compressor, excess current protection circuit 12 is set in place. The excess current protection circuit 12 hold the protection level value of excess current IMC. At time t1 when the current value has exceeded the level value of excess current IMC, the excess current protection circuit 12 blocks the voltage output of inverter, and the result of the blockage is indicated at display unit 13.

The excess current protection circuit 12 can also be installed to embodiments 2 to 4 (not illustrated). Instead of the excess current protection circuit 12, can design something else that achieves similar function as the excess current protection circuit 12 at the start-up control circuit 9.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control unit of refrigerating machine provided with inverter-driven compressor comprising:
    a current detection circuit for detecting current being supplied to drive the compressor; and
    a control circuit for controlling the compressor based on a detected result from the current detection circuit;
    wherein the control circuit is configured to apply an initial frequency and a fixed voltage to the compressor during start-up, to valuate a running mode of the compressor using a detection result from the current detection circuit, and to control an operating frequency of the compressor based on the result from the current detection circuit,
    wherein the control circuit is configured to increase voltage by a fixed amount for every fixed time period when the compressor is not operated, and to valuate the operation mode of the compressor based on the detection result from the current detection circuit.

2. The control unit of refrigerating machine of claim 1, wherein the control circuit is configured to increase the frequency of compressor when the voltage is increased for every fixed time, has reached a previously set driving voltage.

3. The control unit of refrigerating machine of claim 1 further comprising a temperature sensor circuit for detecting temperature characteristic value that is equivalent to temperature of motor of the compressor, and wherein the control circuit valuates whether to apply the initial frequency and the initial voltage to the compressor based on a detected result of the temperature detection circuit at a time of starting signal of the compressor.

4. The control unit of refrigerating machine of claim 3, wherein the control circuit valuates whether the temperature characteristic value has exceeded a pre-setted temperature based on a detection result from the temperature detection circuit, after applying the initial frequency and the initial voltage to the compressor, and controlling the frequency of compressor when the compressor is not operated.

5. The control unit of refrigerating machine of claim 3, wherein the control circuit increases the initial voltage by initial voltage for every fixed time when the compressor is not operated, and then valuates whether the temperature characteristic value has exceeded the pre-setted temperature based on the detection result from the temperature detection circuit.

6. The control unit of refrigerating machine of claim 3, wherein the control circuit increases the initial voltage by a fixed voltage for every fixed time when the compressor is not operated, and then valuates whether the temperature characterisitc value has exceeded the pre-setted temperature, and when the temperature characteristic value has not exceeded the pre-setted temperature, revaluates the operation mode of compressor based on the detection result from the current detection circuit.

7. The control unit of refrigerating machine of claim 1 further comprising an excess current protection circuit for blocking current being supplied to the compressor when the detected result from current detection circuit exceeds an excess current value.

8. The control unit of refrigerating machine of claim 7 further comprising a display unit for indicating a result of blockage by the excess current protection circuit.

9. The control unit of refrigerating machine of claim 1, wherein the control unit is configured to gradually increase the voltage until the current reaches a current level sufficient to drive the compressor.

10. The control unit of refrigerating machine of claim 9 wherein the control unit is configured to stop increasing the voltage when the current reaches the current level sufficient to drive the compressor.

11. The control unit of refrigerating machine of claim 1 wherein the current detection circuit is configured to detect a current input to the compressor.

12. The control unit of refrigerating machine of claim 1 wherein the current detection circuit is configured to detect a current input to a DC-line current of an inverter element.

13. The control unit of refrigerating machine of claim 1 wherein the current detection circuit is configured to detect a current input from a power source.

14. A control method of refrigerating machine provided with inverter-driven compressor comprising steps of:

detecting current being supplied to drive the compressor; and controlling the compressor based on a detection result from the current detecting step;

wherein the controlling step includes steps of applying initial frequency and initial voltage to the compressor on start-up, valuating running mode of the compressor using a detection result from the current detecting step, and controlling an operating frequency of the compressor based on the result from the current detecting step, and increasing voltage by fixed voltage for every fixed time when the compressor is not operated, and then valuating the operation mode of compressor based on the detection result from the current detecting step.

15. The control method of refrigerating machine of claim 14, wherein the controlling step includes a step of increasing the frequency of compressor when the voltage being increased for every fixed time has reached previously set driving voltage.

16. The control method of refrigerating machine of claim 14 further comprising a step of detecting temperature characteristic value that is equivalent to temperature of motor of the compressor, and wherein the controlling step includes a step of valuating whether to apply the initial frequency and the initial voltage to the compressor based on a detected result of the temperature detecting step at a time of starting signal of the compressor.

17. The control method of refrigerating machine of claim 16, wherein the controlling step includes step of valuating whether the temperature characteristic value has exceeded a pre-setted temperature based on a detection result from the temperature detecting step, after applying the initial frequency and the initial voltage to the compressor, and controlling the frequency of compressor when the compressor is not operated.

* * * * *